United States Patent [19]

Barton

[11] Patent Number: 5,027,895

[45] Date of Patent: Jul. 2, 1991

[54] EXPANDABLE PACKER APPARATUS

[76] Inventor: Kenneth S. Barton, 3921 Prospect Ave., Naples, Fla. 33942

[21] Appl. No.: 422,026

[22] Filed: Oct. 16, 1989

[51] Int. Cl.⁵ .................... E21B 33/124; E21B 33/127
[52] U.S. Cl. .................................. 166/186; 166/187; 166/191; 138/97
[58] Field of Search ............... 166/277, 186, 187, 191, 166/50; 138/97, 98

[56] References Cited

U.S. PATENT DOCUMENTS

| 2,808,852 | 10/1957 | Brant | 138/97 |
| 3,103,235 | 9/1963 | Stringham, III | 138/97 |
| 3,618,639 | 11/1971 | Daley et al. | 138/97 |

FOREIGN PATENT DOCUMENTS

| 3404354 | 12/1985 | Fed. Rep. of Germany | 138/97 |
| 1161407 | 8/1969 | United Kingdom | 138/97 |

Primary Examiner—William P. Neuder
Attorney, Agent, or Firm—William E. Noonan

[57] ABSTRACT

An expandable packer is disclosed for repairing a rupture in an underground conduit. The device includes a first packer section formed proximate a first end and having a first inflatable bladder mounted peripherally thereon. A second packer section is formed proximate a second end and has a second inflatable bladder mounted peripherally thereon. A packer discharge coupling is releasably interconnectable with the first section and includes discharge port means. A packer extension section extends between the discharge coupling and the second packer section. There are means for releasably coupling one end of the packer extension section with the second packer section. The discharge coupling includes means for releasably interconnecting the opposite end of the extension section with the discharge coupling. Compressed air or other gas is selectively introduced into the bladders to inflate the bladders so that they sealably engage the conduit. A sealant is then introduced through the discharge ports, into the conduit, and through the rupture to outside the conduit to seal and repair the rupture.

21 Claims, 3 Drawing Sheets

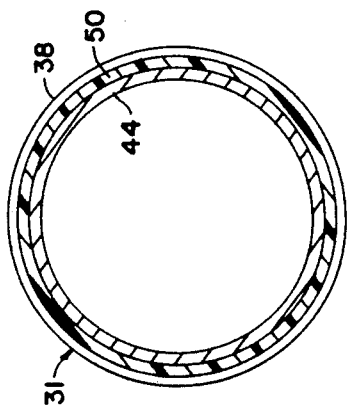
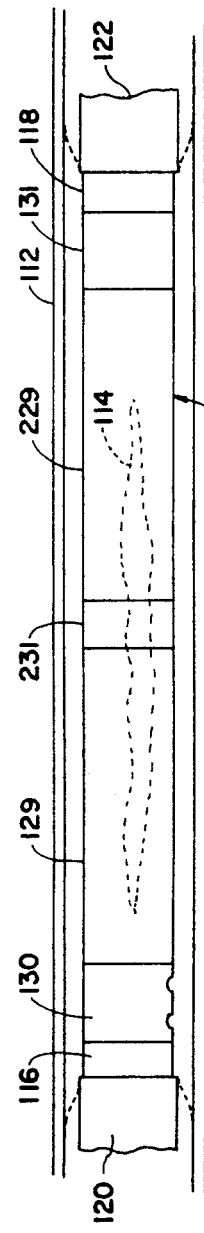
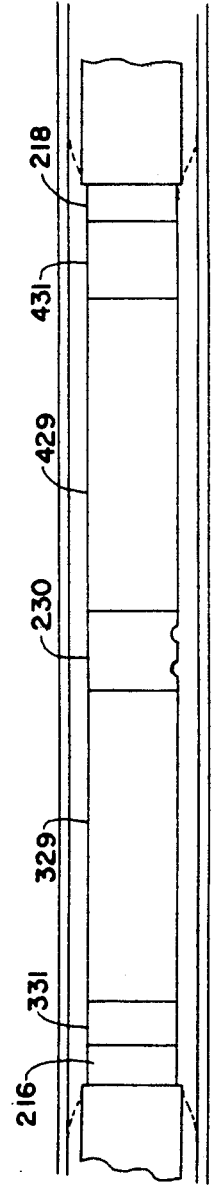

EXPANDABLE PACKER APPARATUS

FIELD OF THE INVENTION

This invention relates to an expandable packer apparatus for repairing ruptures in underground conduits and, in particular, to a unique structure for adjusting the length of an underground packer.

BACKGROUND OF THE INVENTION

Conventional devices known as packers have been utilized for repairing cracks in sewer pipes and other underground conduits. Typically, after the pipe is scanned by a camera to ascertain the location of the rupture, the packer is introduced into the pipe and positioned near the damage. A pair of bladders located at the respective ends of the packer are inflated to close off a discrete segment of the pipe to be repaired. A two part grout or gel is then introduced through discharge ports in the packer into the region defined by the bladders. This material is forced through the crack and is allowed to solidify on the outside of the conduit.

Unfortunately, conventional packers are limited in length. As a result, they are often ineffective for repairing extensive lateral ruptures. Moreover, previously employed packer devices may actually cause further damage to the pipe. For example, if one or both of the bladders are positioned against the crack, each such bladder bears against the crack as the bladder is inflated. This can cause the crack to expand and may even cause the pipe to explode or collapse.

SUMMARY OF INVENTION

It is therefore an object of this invention to provide an improved expandable packer that allows the packer bladders to be quickly and conveniently positioned to engage undamaged rather than damaged sections of pipe so that successful in situ pipe repairs can be accomplished and further pipe deterioration is avoided.

It is a further object of this invention to provide an expandable packer that is effective for repairing all lengths of lateral cracks and ruptures in underground pipe.

It is a further object of this invention to provide an expandable packer that may be quickly and conveniently assembled and disassembled at the work site.

This invention results from a realization that conventional packers are often ineffective because when inflated they tend to cause excessive pressure against and damage to cracked or ruptured portions of the pipe. This invention results from the further realization that such damage may be avoided by adjusting the length of the packer so that the inflatable bladders may be positioned to bear only against good or undamaged pipe.

This invention features an expandable packer for repairing a rupture in an underground conduit. There is a first packer section formed proximate a first end and having a first inflatable bladder mounted peripherally thereon. A second packer section is formed proximate a second end and has a second inflatable bladder mounted peripherally thereon. A packer discharge coupling is releasably interconnected with the first section and includes discharge port means. A packer extension portion extends between the discharge coupling and the second section. There are means for releasably coupling one end of the packer extension section with the second section. The opposite end of the extension section is releasably engagable with the discharge coupling.

There are means disposed through the first and second sections for selectively introducing gas into the bladders to inflate the bladders to sealably engage the inside wall of the conduit. Means are provided for introducing sealant through the discharge port means, into the conduit, and through the rupture to seal and repair the rupture.

In a preferred embodiment the extension section includes a plurality of discrete extension pieces arranged generally end to end. Additional means may be provided for coupling adjacent pairs of the extension pieces. The packer extension section may include an outside diameter that is generally equal to that of the second section.

The packer sections preferably include a tubular shape. The means for coupling may include an annular central portion having an outside diameter that is generally equal to that of the extension section and the second section, an annular first end portion having a reduced diameter that is snugly receivable by the extension section, and an annular second end portion having a reduced diameter that is snugly receivable by the second section. The means for coupling may further include channel means formed on either side of the central portion for accommodating first and second seals. The first seal is engagable with an end of the extension section and the second seal is engagable with the second section to provide a sealing fit between the means for coupling and each of the extension section and the second section.

The tubular discharge coupling may include an annular intermediate portion having an outside diameter that is generally equal to that of the extension section and the first section, an annular first end portion having a reduced diameter that is snugly receivable by the extension section, and an annular second end portion having a reduced diameter that is snugly receivable by the first section.

In certain embodiments of this invention a second packer extension section may extend between the discharge coupling and the first section. Means may be provided for releasably coupling one end of the second packer extension section with the first packer section and means may be provided for releasably interconnecting the opposite end of the second packer extension with the discharge coupling.

This invention also features an improvement in underground conduit packer devices which include first and second packer sections disposed at opposite ends, each supporting a respective inflatable bladder, and wherein a discharge section interconnects the first and second packer sections. This improvement comprises a packer extension section which extends between the discharge section and the second packer section. There are means for releasably coupling one end of the packer extension section with the second section and means are provided for releasably interconnecting the opposite end of the packer extension section with the discharge section. In such embodiments, the discharge section may comprise a discharge coupling as described above. Alternatively, the discharge section may be permanently fixed to the first packer section. In the latter case, the means for interconnecting typically include a reduced diameter segment that is attached to the discharge section and snugly receivable by one end of the extension section.

DISCLOSURE OF PREFERRED EMBODIMENTS

Other objects, features and advantages will occur from the following description of preferred embodiments and the accompanying drawings, in which:

FIG. 3 is a cross sectional view taken along line 4—4 of FIG. 3 illustrating the coupling of this invention;

FIG. 4 is a simplified elevational view of an expandable packer that employs a plurality of extension pieces between the discharge coupling and one of the packer sections; and FIG. 5 is a simplified elevational drawing of an expandable packer that employs extension pieces between each packer section and the discharge coupling.

Figure 1:
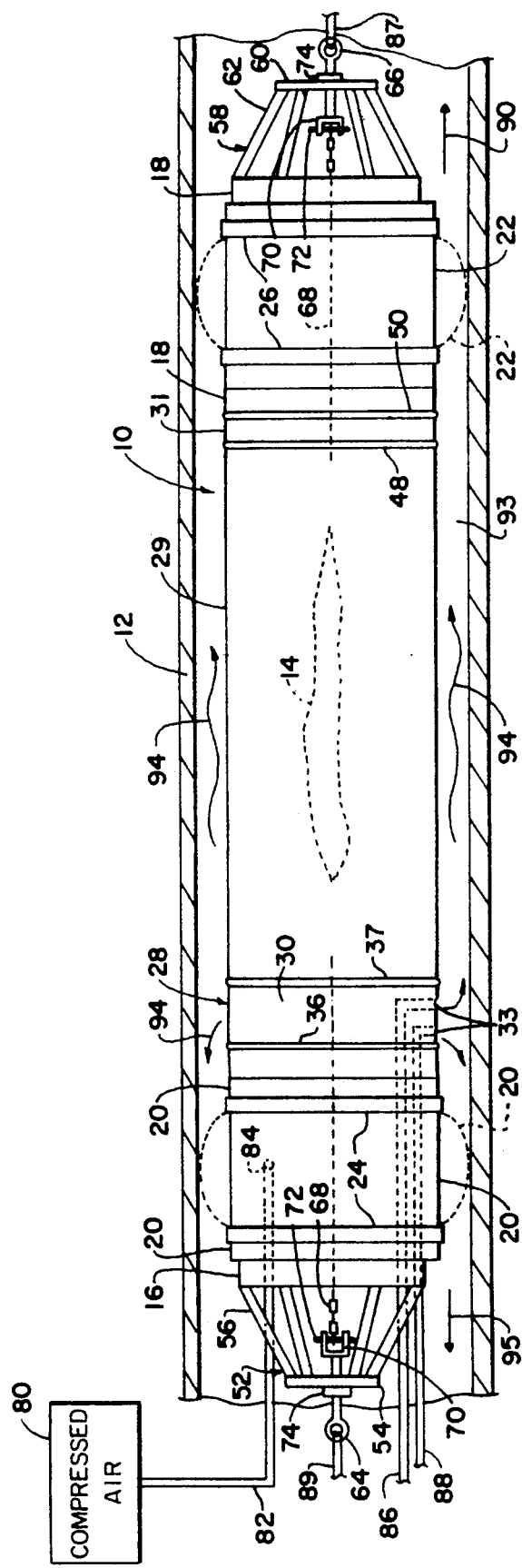
FIG. 1 is an elevational side view of the expandable packer of this invention.
Figure 2:
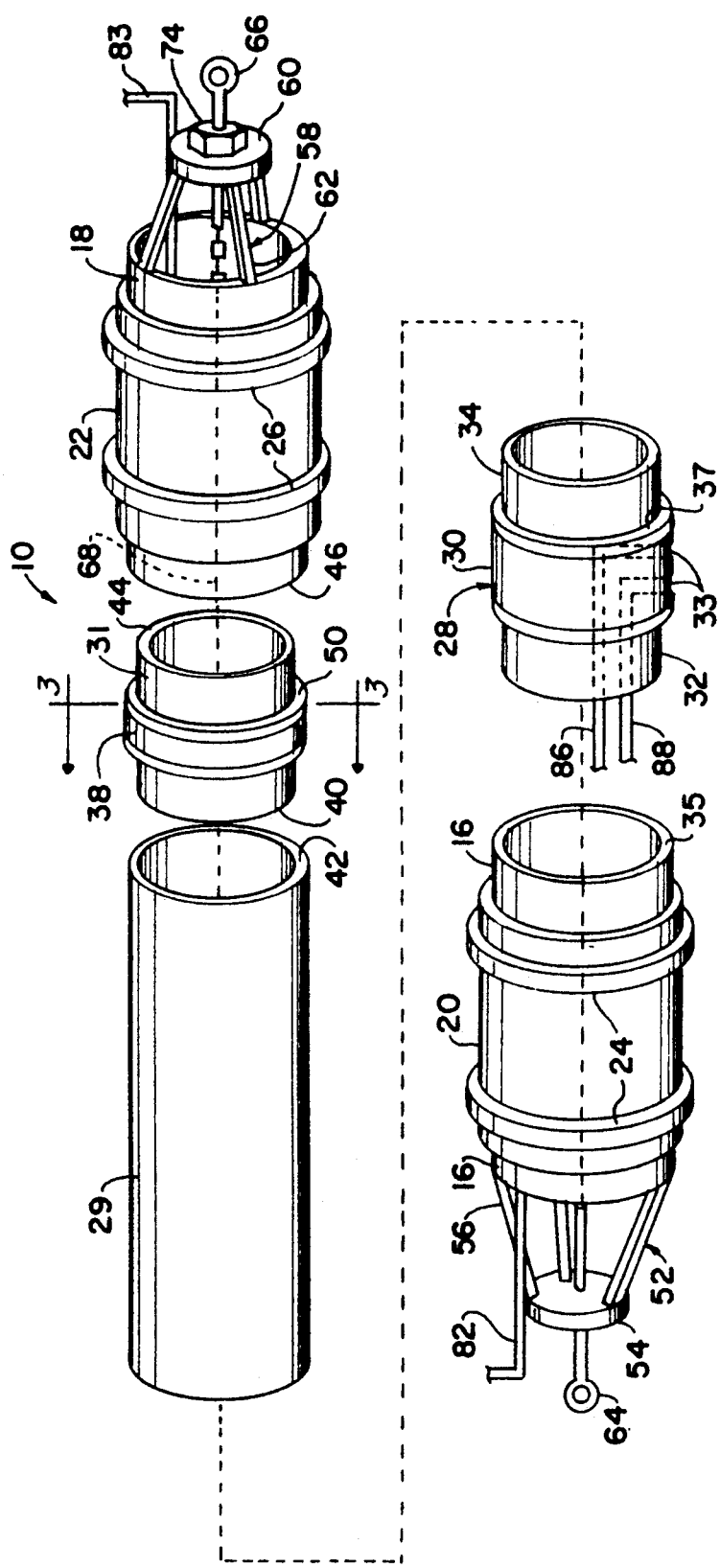
FIG. 2 is an exploded view of the expandable packer.

There is shown in FIG. 1 an expandable packer apparatus 10 arranged within an underground sewer pipe or conduit 12 adjacent to a rupture 14 to be repaired. As used herein, "rupture" refers to all types of cracks, breaks and other damage to sections of underground pipe. Apparatus 10 includes an elongate, generally tubular shape and has a diameter that is somewhat less than the inside diameter of pipe 12. As shown in FIGS. 1 and 2, packer 10 includes a tubular first packer section 16 formed proximate one end of the apparatus and a similar tubular second packer section 18 formed proximate the opposite end of the apparatus. Both sections 16 and 18 have a pair of open ends. A first inflatable annular bladder 20 is mounted peripherally on packer section 16 and a similar second annular bladder 22 is mounted peripherally on second section 18. Bladder 20 is secured to section 16 by adjustable diameter clamps 24 and bladder 22 is likewise secured to section 18 by clamps 26. The bladders are composed of rubber or other elastomeric materials.

Packer sections 16 and 18 are interconnected by a discharge section 28, a packer extension section 29 and a coupling 31. All of the tubular packer sections are typically composed of materials that will not collapse under low pressure. These may include aluminum or other metals or metal alloys, PVC and other plastics, hard rubber and other compositions. As shown most clearly in FIG. 2, discharge section 28 includes an annular intermediate portion 30 that has an outside diameter which is generally equal to that of packer section 16 and packer extension section 29. Intermediate portion 30 includes a pair of discharge ports 33. A first annular end portion 32 extends axially in one direction from intermediate portion 30 and is snugly, yet removably received by open end 35 of packer section 16. A second annular end portion 34 of discharge section 30 has a reduced diameter such that it is snugly and removably received by one open end of packer extension section 29. Annular end portions 32 and 34 may comprise a single integral tubular element about which intermediate portion 30 is circumferentially disposed. Alternatively, end portions 32 and 34 may be formed by distinct elements which extend from opposite ends of intermediate portion 30. Discharge coupling 28 is attached to packer section 16 by slidably inserting end portion 32 into end 35 of section 16. The elements are disattached by sliding portion 32 out of section 16. Opposite end portion 34 is similarly slid into and out of extension section 29 to selectively connect the discharge coupling with the extension section.

Each of the two edges of intermediate portion 30 includes a channel that is formed between portion 30 and the circumference of a respective end portion 32, 34. These channels accommodate respective annular, 0-ring seals 36 and 37. Seal 36 is engaged by end 35 of packer section 16. The other seal 37 is engaged by the end of packer extension section 29. These seals prevent the sealant which is dispensed by apparatus 10 from entering the interior of the packer section after it is dispensed.

Coupling 31 includes an annular central portion 38 having an outside diameter which is generally equal to that of extension section 29 and second packer section 18. As shown in FIG. 2, an annular first end portion 40 extends in one direction from central portion 38 and is snugly, yet removably receivable by open end 42 of extension section 29. A second end portion 44 extends in a second direction from central portion 38 and is snugly and removably receivable by open end 46 of packer section 18. Coupling 31 is constructed in a manner analogous to discharge coupling 30. In particular, end portions 40 and 42 may comprise a single inner tube about which central portion 38 is wrapped. Alternatively, each of the end portions may comprise a distinct tube. Moreover, 0-ring seals 48 and 50 are disposed in channels formed along the respective sides of central portion 38. Seal 48 is engaged by end 42 of extension section 29 and seal 50 is similarly engaged by end 46 of packer section 18. As a result, sealant is prevented from entering apparatus 10 between the extension section 29, coupling 31 and second packer section 18.

A first yoke 52, FIGS. 1 and 2, is attached to first section 16. In particular, yoke 52 includes a ring portion 54 and a plurality of legs 56 that extend generally divergently from ring 54. The distal end of each leg 56 is welded or otherwise permanently mounted to the side of packer section 16. A second yoke 58 is likewise permanently attached to second packer section 18. Yoke 58 includes a ring 60 and a plurality of legs 62 that are interconnected permanently between ring 60 and the sides of packer section 18. Both yokes 52 and 58 have generally truncated, conical shapes.

A bolt 64 is disposed through the central opening in ring 54 and a similar bolt 66 is mounted through the opening in opposite ring 60. Bolts 64 and 66 are interconnected by a chain 68 that extends centrally through apparatus 10. More particularly, as shown in FIG. 1, a C-shaped attachment element 70 is disposed through the distal end of each bolt. A pin 72 extends between the ends of element 70 and a respective end of chain 68 engages each of the pins 72. A nut 74 is disposed about each of the bolts 64, 66 between the head of the bolt and its respective ring 54, 60. Because the respective yokes 52 and 58 formed at the ends of apparatus 10 are interconnected in the above manner, the entire apparatus 10 may be pulled through an underground conduit 12 without experiencing separation of the interconnected packer sections. This operation is described more fully below.

As exhibited most clearly in FIG. 1, a source 80 of compressed air or other gas, is interconnected by a line 82 which extends into packer section 16 to an orifice 84 which is formed in section 16 beneath bladder 20. Air from source 80 is pumped through line 82 and through orifice 84 to inflate bladder 20, as indicated in phantom. Similar structure, including an input line 83, FIG. 2, is provided for selectively inflating second bladder 22.

Liner 82 and 83 may be connected to a single source of compressed air, such as by a T-connector.

A pair of sealant injection conduits 86 and 88, FIGS. 1 and 2, extend from a service vehicle above the surface, through the open end of packer section 16 and into discharge section 28 where they terminate in respective discharge ports 33. Each of the conduits 86 and 88 conducts a respective part of a two part adhesive (such as a two part gel) to the discharge port 33 for injection into the conduit in a manner described more fully below.

In operation, before apparatus 10 is introduced into conduit 12, the conduit is scanned in a conventional manner by a sled mounted camera, not shown, to determine the condition of the conduit and to ascertain the location and extent of rupture 14. This enables apparatus 10 to be constructed sufficiently long so that bladders 20 and 22 may be positioned against undamaged sections of pipe. In the disclosed example, discharge coupling 28, packer extension section 29 and coupling 31 are interconnected between packer sections 16 and 18 in the manner described above. In particular, the reduced diameter end portions 32 and 34 of coupling 28 are slid into respective openings in sections 16 and end portions 40 and 44 of coupling 31 are similarly engaged with sections 29 and 18, respectively. Apparatus 10 is then connected to the scanning camera by attaching a line 87 from the camera (not shown) to the bolt 66 attached to yoke 58. The camera and apparatus 10 are then drawn into conduit 12 through a manhole by a conventional winch or similar apparatus that is disposed proximate a remote manhole. The apparatus is drawn through conduit 12 in the direction of arrow 90, FIG. 2, until it is positioned with packer extension section 29 arranged adjacent to rupture 14. A trailing line 89, connected between bolt 64 and a service vehicle located above the ground, is drawn behind apparatus 10 and into conduit 12. By drawing either line 87 in the direction of arrow 90 or line 89 in the direction of arrow 95, apparatus 10 may be adjusted to the appropriate position beside the rupture. This positioning is monitored by the camera which provides a visual image to service personnel located with the vehicle. As indicated above, because chain 68 interconnects forward yoke 58 and trailing yoke 52, both the forward and rearward ends of apparatus 10 are pulled simultaneously so that the individual tubular sections to not become separated from one another.

When apparatus 10 is properly positioned with the bladders 20 and 22 clear of rupture 14, the sealing operation is commenced. Compressed air is introduced through lines 82 and 84 so that bladders 20 and 22 are inflated, as shown in phantom in FIG. 2. As a result, inflated bladders 20 and 22 sealably engage undamaged areas of the walls of conduit 12. This defines a region 93 which is bounded by the inflated bladders. Because bladders 20 and 22 engage and bear against undamaged conduit 12 when they are inflated, rupture 14 is not engaged and the conduit will not explode or further deteriorate. A two part sealant or gel is introduced through lines 86 and 88 and discharged through ports 33 into region 93. The sealant travels through, and is mixed together within region 93, as indicated by arrows 94. The sealant is forced through rupture 14 to outside the pipe but is restricted within the pipe to region 93 by the inflated bladders 20 and 22, which have sealed the conduit. The sealant is then allowed to solidify outside the pipe to seal the rupture. Subsequently, the bladders are deflated by releasing the air through lines 82 and 84. Apparatus 10 is then removed through one of the manholes, either by drawing line 89 in the direction of arrow 95 or by drawing line 87 in the direction of arrow 90. The tubular packer sections and coupling may then be separated for convenient storage and transport.

In alternative embodiments, various other arrangements of couplings and multiple extension pieces may be employed. Typically, each extension piece is approximately 3 feet in length, although alternative lengths are within the scope of this invention. If an extended lateral rupture is encountered, the apparatus may be adjusted in length to accommodate for the size of that crack. For example, as shown in FIG. 4, an extended rupture 114 may be longer than a single packer extension piece 129. Accordingly, to extend the length of apparatus 110 so that bladders 120 and 122 engage undamaged portions of conduit 112, an additional extension piece 229 and coupling 231 are employed. More particularly, discharge coupling 130 is connected, as previously described, to a packer section 116 supporting an inflatable bladder 120. Extension piece 129 is connected, again as described above, to the opposite end of coupling 130. To increase the length of apparatus 110, a coupling 231, as previously described, is employed to connect a second extension piece 229 to the other end of extension piece 129. A second coupling 131 interconnects extension piece 229 to the end of packer section 118 supporting bladder 122. Still further extension pieces may be employed if rupture 114 so requires.

As shown in FIG. 5, in still further embodiments, the discharge coupling 231 may be disposed between a pair of extension pieces 329 and 429. Extension piece 329 is connected by a coupling 331 to packer section 216. Extension piece 429 is similarly connected by a coupling 431 to packer section 218. In each case, the couplings and extension pieces are constructed and interconnected as described in the initial embodiment. Accordingly, the discharge coupling may be placed at any desired location along the expandable packer apparatus. Any number of additional extension pieces and couplings may be employed between either end of the discharge coupling and a respective one of the first and second packer sections 216 and 218.

As disclosed in each of the above embodiments, the expandable packer apparatus of this invention may be quickly and conveniently adjusted in size to address any size of lateral crack or rupture in a sewer line or other underground conduit. In each case, the adjustment is made so that the bladders of the packer engage an undamaged section of pipe when those bladders are inflated. As a result, pressure is not placed upon the rupture and further deterioration of the pipe is greatly reduced.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. In a packer device for repairing a rupture in underground conduits, which device includes first and second ends, a first packer section formed proximate one end and having a generally tubular wall, a first inflatable bladder mounted peripherally about said wall of said first packer section, a second packer section formed proximate the opposite end and having a generally tubular wall, a second inflatable bladder mounted peripherally about said wall of said second packer section, duct means disposed through said walls of said first and second sections for introducing gas into said bladders to selectively inflate said bladders, a packer discharge section interconnectable between said first and second packer sections and including discharge port means, and means for introducing sealant through said discharge port means, into the underground conduit, and through the rupture to outside the conduit to seal and repair the rupture, the improvement comprising:

a packer extension section which extends between said discharge section and said second packer section;

means for releasably coupling one end of said packer extension section with said wall of said second packer section; and means for releasably interconnecting the opposite end of said packer extension section with said discharge section.

2. The improvement of claim 1 in which said extension section includes a plurality of discrete extension pieces arranged generally end to end.

3. The improvement of claim 2 further including means for coupling adjacent pairs of said extension pieces.

4. The improvement of claim 1 in which each said packer section has a tubular shape.

5. The improvement of claim 4 in which said packer extension section includes an outside diameter that is generally equal to that of said second section.

6. The improvement of claim 5 in which said means for coupling include an annular central portion having an outside diameter that is generally equal to that of said extension section and said second section, an annular first end portion having a reduced diameter that is snugly receivable by said extension section, and an annular second end portion having a reduced diameter that is snugly receivable by said second section.

7. The improvement of claim 6 in which said means for coupling further include channel means formed on either side of said central portion for accommodating first and second seals, said first seal being engagable with said end of said extension section and said second seal being engagable with said second section to provide a sealing fit between said means for coupling and each of said extension section and said second section.

8. The improvement of claim 4 in which said means for interconnecting include a reduced diameter tubular segment that is attached to said discharge section and snugly receivable by said opposite end of said extension section.

9. The improvement of claim 1 further including a second packer extension section which extends between said discharge section and said first packer section, means for releasably coupling one end of said second packer extension section with said first packer section, and means for releasably interconnecting the opposite end of said second packer extension section with said discharge section.

10. The device of claim 1 in which said wall of said first and second packer sections are generally rigid.

11. An expandable packer apparatus for repairing a rupture in an underground conduit comprising:

a first packer section formed proximate a first end and having a a generally tubular wall;

a first inflatable bladder mounted peripherally about said wall of said first packer section;

a second packer section formed proximate a second end and having a generally tubular wall;

a second inflatable bladder mounted peripherally about said wall of said second packer section;

a discharge coupling releasably interconnectable with said first section and including discharge port means;

a packer extension section that extends between said discharge coupling and said second packer section;

means for releasably coupling one end of said packer extension section with said wall of said second section, said discharge coupling including means for releasably interconnecting the opposite end of said extension section with said discharge coupling;

duct means disposed through said walls of said first and second sections for selectively introducing gas into said bladders to inflate said bladders to sealably engage the inside wall of the conduit; and means for introducing sealant through said discharge port means, into the conduit, and through said rupture to outside said conduit to seal and repair the rupture.

12. The device of claim 10 in which said extension section includes a plurality of discrete extension pieces arranged generally end to end.

13. The device of claim 12 further including means for coupling adjacent pairs of said extension pieces.

14. The device of claim 13 in which said packer sections have a tubular shape.

15. The device of claim 14 in which said packer extension section includes an outside diameter that is generally equal to that of said second section.

16. The improvement of claim 15 in which said means for coupling include an annular central portion having an outside diameter that is generally equal to that of said extension section and said second section, an annular first end portion having a reduced diameter that is snugly receivable by said extension section, and an annular second end portion having a reduced diameter that is snugly receivable by said second section.

17. The device of claim 16 in which said means for coupling further include channel means formed on either side of said central portion for accommodating first and second seals, said first seal being engagable with one end of said extension section and said second seal being engagable with said second section to provide a sealing fit between said means for coupling and each of said extension section and said second section.

18. The device of claim 14 in which said means for releasably interconnecting include a reduced diameter tubular segment that is formed at one end of said discharge section and is snugly receivable by said opposite end of said extension section.

19. The device of claim 14 further including a second tubular packer extension section which extends between said discharge section and said first tubular section, and means for releasably coupling one end of said second packer extension section with said first section, said discharge coupling including means for releasably interconnecting the opposite end of said second packer extension section with said discharge coupling.

20. The packer of claim 14 in which said tubular discharge coupling includes an annular intermediate portion having an outside diameter that is generally equal to that of said extension section and said first section, an annular first end portion having a reduced diameter that is snugly receivable by said extension section and an annular second end portion having a reduced diameter that is snugly receivable by said first section.

21. The device of claim 11 in which said walls of said first and second packer sections are generally rigid.

* * * * *